(12) United States Patent
Olink

(10) Patent No.: US 7,669,365 B2
(45) Date of Patent: Mar. 2, 2010

(54) LAWN EDGING

(76) Inventor: Stephen Olink, 1720 Paris Street, Suite 501, Sudbury, Ontario (CA) P3E 3C2

( * ) Notice: Subject to any disclaimer, the term of this patent is extended or adjusted under 35 U.S.C. 154(b) by 129 days.

(21) Appl. No.: 11/708,331

(22) Filed: Feb. 21, 2007

(65) Prior Publication Data

US 2007/0193112 A1    Aug. 23, 2007

Related U.S. Application Data

(60) Provisional application No. 60/775,773, filed on Feb. 23, 2006.

(51) Int. Cl.
*E01C 11/22* (2006.01)
*A01G 1/00* (2006.01)
(52) U.S. Cl. .............. 47/33; 404/8; D25/164; 52/102
(58) Field of Classification Search ............ 47/33; 52/102, 311, 273, 274, 311.1–311.3; 404/7, 404/8; D25/164
See application file for complete search history.

(56) References Cited

U.S. PATENT DOCUMENTS 3,803,760 A * 4/1974 Matvey .................. 47/33
4,663,883 A * 5/1987 Hilliard et al. ........... 47/33
D396,308 S * 7/1998 Hagglund ............... D25/164
D400,985 S * 11/1998 Risi ....................... D25/164
6,385,898 B1 * 5/2002 Noel ....................... 47/33
D472,984 S * 4/2003 Foster .................... D25/164
2002/0121052 A1 * 9/2002 Olink ...................... 52/102

* cited by examiner

*Primary Examiner*—Rob Swiatek
*Assistant Examiner*—Danielle Bates
(74) *Attorney, Agent, or Firm*—Elias Borges

(57) ABSTRACT

A lawn edging consisting of an elongated extrusion made of a flexible and resilient polymer, the extrusion having opposite ends. The extrusion has a bottom, first and second side walls extending from the bottom and a transverse cross brace connecting the side walls together. The bottom has a toe portion extending perpendicularly from the first wall. The first wall is divided into an upper portion above the transverse cross brace and a lower portion between the transverse cross brace and the toe portion, the lower portion being perpendicular with respect to the toe portion. The upper portion of the first wall is at an obtuse angle to the lower portion such that the upper portion extends away from the lower portion of the side wall and away from the second side wall. The upper portion is configured to be flexible and resilient. The extrusion has an open top defined byte upper portion of the first and second walls which flare out relative to lower portions of the first and second walls.

8 Claims, 3 Drawing Sheets

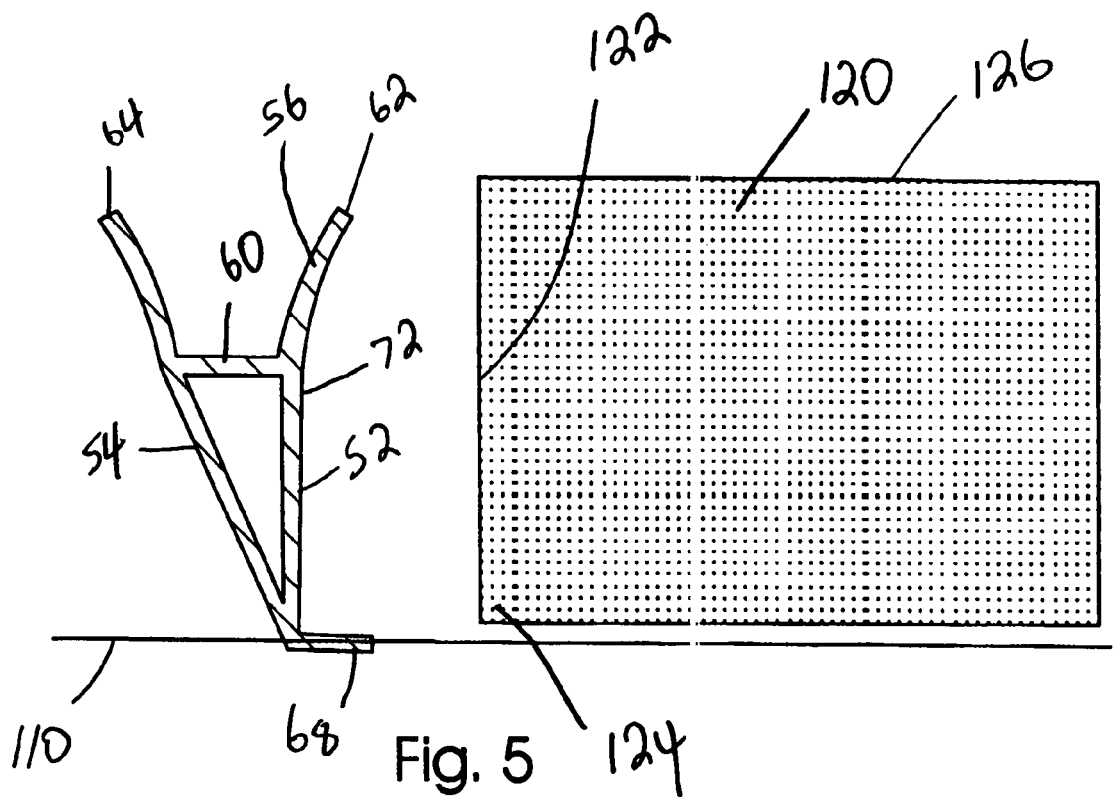
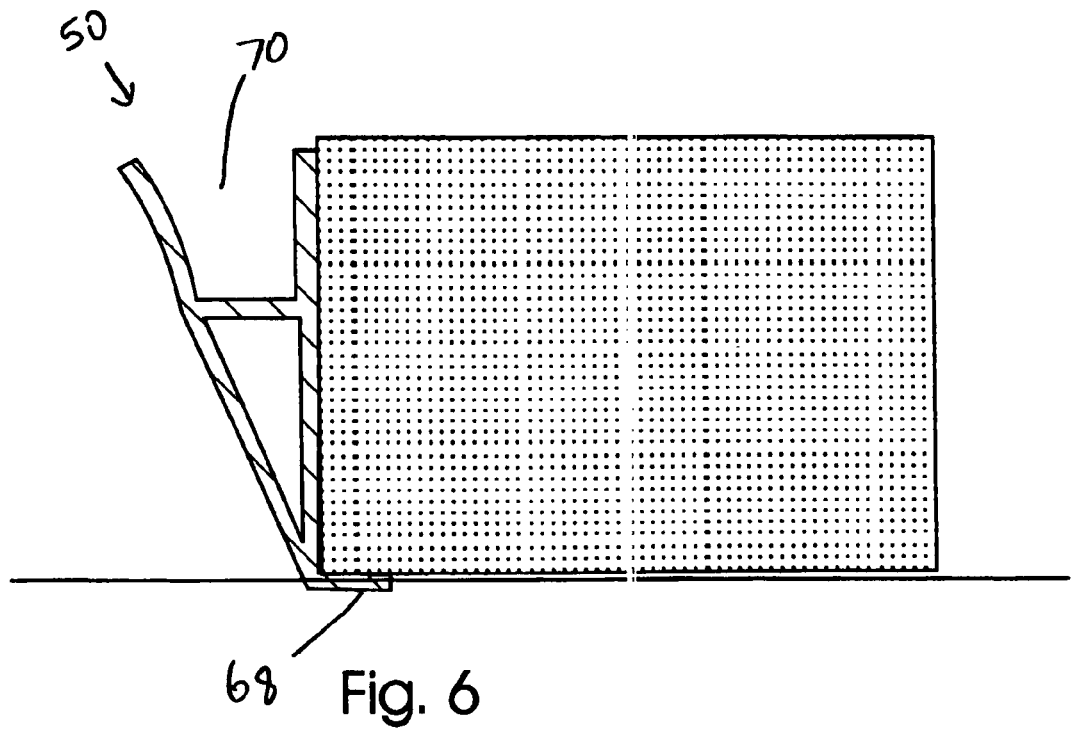

LAWN EDGING

CROSS-REFERENCE TO RELATED APPLICATION

The applicant claims priority from U.S. provisional patent application Ser. No. 60/775,773 filed by the applicant on Feb. 23, 2006, the entirety of which is incorporated herein by reference.

FIELD OF THE INVENTION

The invention relates generally to lawn edging.

BACKGROUND OF THE INVENTION

Pavement edging blocks and boarders are well known. They generally consist of brick like stone products which are used to form a decorative edging around a driveway, a lawn or other areas. These block like paving edging devices tend to be heavy and expensive. In more recent times, lawn edging devices have been made out of extruded material such as plastic. These extruded edging devices can be quite decorative but often fail to prevent grass from encroaching on to the paved areas.

Another method of edging a lawn consists of digging a trench along the lawn adjacent to the paved area. This yields a very attractive and decorative look to the lawn. Unfortunately, grass often encroaches into the trench through root propagation. Furthermore, maintaining a clean and unobstructed trench requires considerable work as grass clippings and other debris often fall into and clog the trench. An improved lawn edging device which is easy to install and maintain and minimized grass encroachment is therefore required.

SUMMARY OF THE INVENTION

The present invention overcomes the drawbacks of the prior art by providing a continuous lawn edging which fits tightly against paving stones. The present invention consists of an elongated extrusion made of a flexible and resilient polymer, the extrusion having opposite ends. The extrusion has a bottom, first and second side walls extending from the bottom and a transverse cross brace extending between and the side walls and connecting the side walls together. The bottom has a toe portion extending perpendicularly from the first wall, the toe portion being dimensioned and configured to fit beneath the paving stones. The first wall is divided into an upper portion above the transverse cross brace and a lower portion between the transverse cross brace and the toe portion, the lower portion being perpendicular with respect to the toe portion. The upper portion of the first wall is at an obtuse angle to the lower portion such that the upper portion extends away from the lower portion of the side wall and away from the second side wall. The upper portion is configured to be sufficiently flexible and resilient such that when the first side wall is urged against the paving stones the upper portion of the first side wall is deflected to be substantially co-planar to the lower portion of the first side wall and the upper portion is biased against the paving stone.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention.

DESCRIPTION OF THE DRAWINGS

FIG. 5. is a cross-sectional view of the lawn edging device of FIG. 2 being installed.

FIG. 6. is a cross-sectional view of the lawn edging device of FIG. 2 being installed.

In the drawings like characters of reference indicate corresponding parts in the different figures.

DETAILED DESCRIPTION OF THE INVENTION

Figure 1:
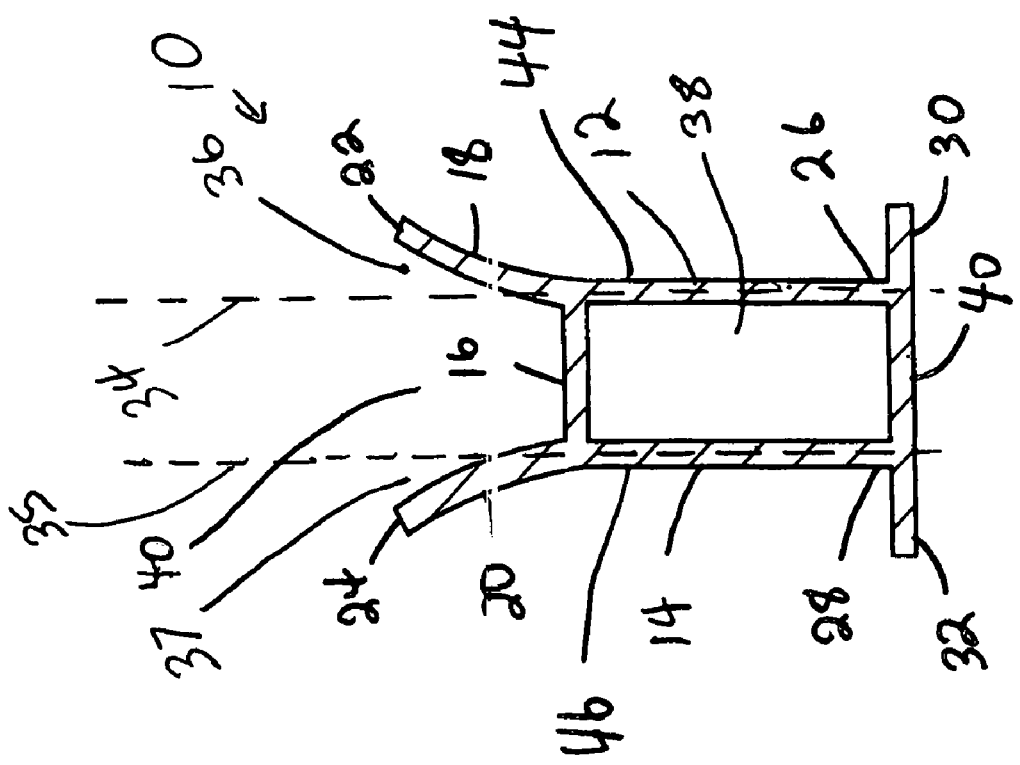
FIG. 1. is a cross-sectional profile view of a lawn edging device made in accordance with the present invention.

Referring firstly to FIG. 1, a lawn edging device made in accordance with the present invention is shown generally as item 10 and consists of an elongated plastic extrusion having opposite ends. The extrusion has side walls 12 and 14, which are mounted together by cross brace 16 and bottom 40. Side walls 12 and 14 have upper portions 18 and 20, respectively, extending above brace 16. Upper portions 18 and 20 have upper edges 22 and 24, respectively. Walls 12 and 14 are parallel and are perpendicularly arranged relative to bottom 40 and brace 16. Upper portion 18 and 20 are flared outwardly away from each other such that upper portion 18 is at angle 36 from vertical line 34 extending from wall 12 and upper portion 20 is at angle 37 from vertical line 35 extending from wall 14. Preferably, angels 36 and 37 are between 0 and 25 degrees. Extrusion 10 has outer surfaces 44 and 46. Toe portions 30 and 32 extend perpendicularly away from walls 12 and 14, respectively at bottom ends 26 and 28 of walls 12 and 14, respectively. Extrusion 10 has open top 40 the width of which is defined by the length of brace 16 and the depth of which is determined by the length of upper portions 12 and 20. Open to 40 is wider between edges 22 and 24 than along brace 16. Internal cavity 38 is formed in the extrusion and its dimensions are defined by the dimensions of walls 12 and 14, bottom 40 and brace 16.

Figure 2:
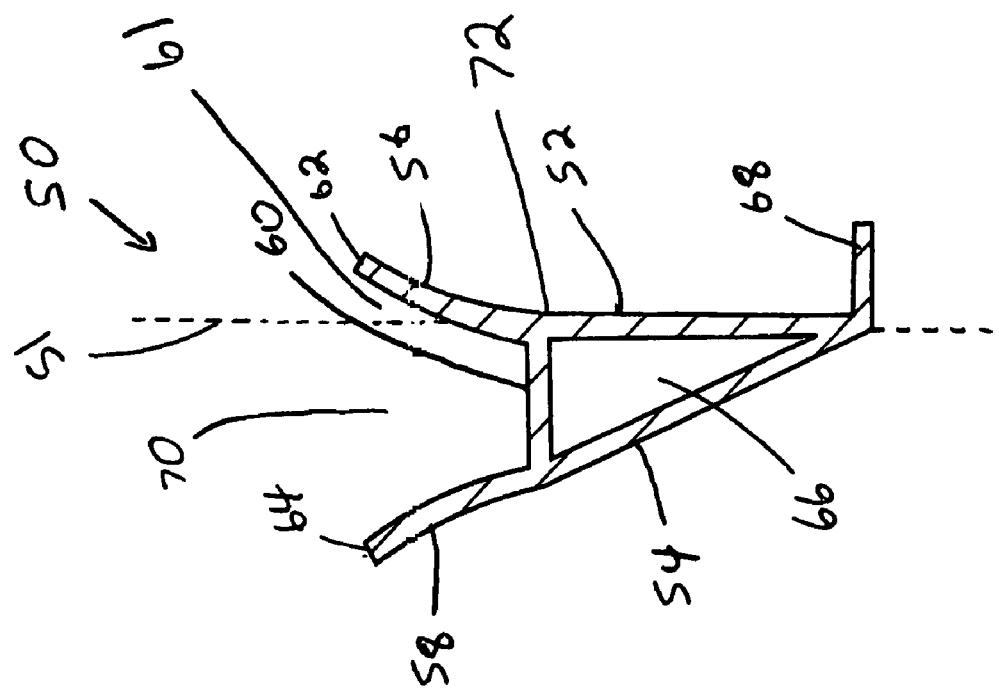
FIG. 2. is a cross-sectional profile view of an alternate embodiment of a lawn edging device made in accordance with the present invention.

Referring now to FIG. 2, an alternate embodiment of a lawn edging device made in accordance with the present invention is shown generally as item 50 and consist of an elongated extrusion having opposite ends. The extrusion has walls 52 and 54, brace 60 upper portions 56 and 58 and toe portion 68 extending perpendicularly away from wall 52. Walls 54 and 52 are at an acute angle to each other and, together with brace 60, form a triangular tube structure having internal cavity 66. Upper portions 56 and 58 have top edges 62 and 64, respectively. Upper portion 56 flairs transversely outward relative to wall 52 such that upper portion 56 is at angle 61 from vertical line 51 drawn along wall 52. Extrusion 50 has open top 70 defined by upper portions 58 and 56 and brace 60. Open top 70 is wider between edges 62 and 64 than along brace 60.

Figure 3:
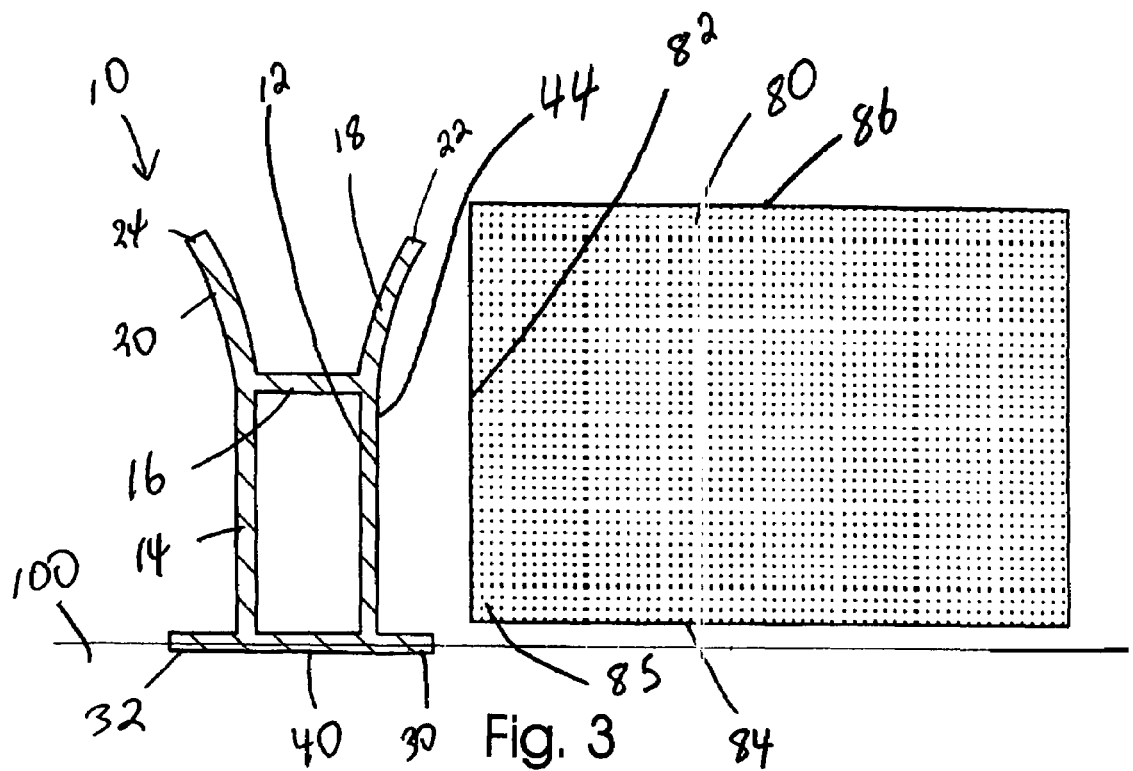
FIG. 3. is a cross-sectional view of the lawn edging device of FIG. 1 being installed.
Figure 4:
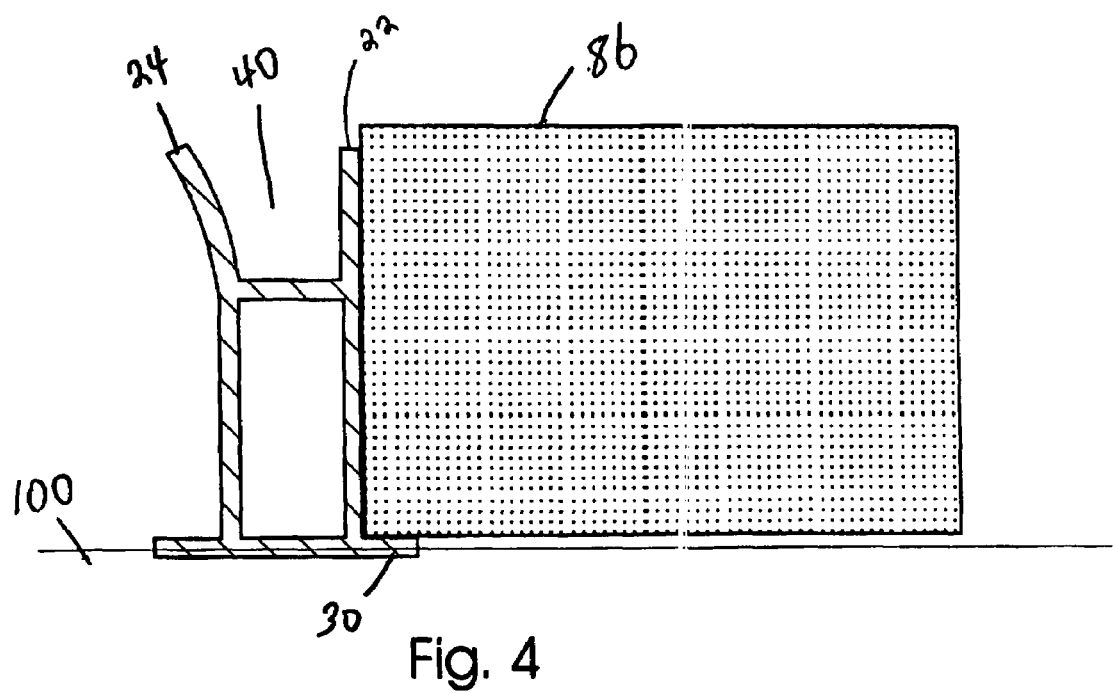
FIG. 4. is a cross-sectional view of the lawn edging device of FIG. 1 being installed.

Referring now to FIGS. 3 and 4, to use the lawn edging, lawn edging device 10 is laid on bare ground 100 such that bottom 40 rests on the ground and the lawn edging is supported upright by toe portions 30 and 32. Paving brick 80 is then brought into position adjacent lawn edging 10 such that face 82 of the brick is positioned adjacent face 44 of the lawn edging device. The brick and lawn edging are then urged together such that face 82 of brick 80 is flat against surface 44 of the lawn edging. Extrusion 10 is made of a resiliently deformable thermoplastic material such as polyethylene or PVC permitting upper portion 18 to deform when the brick is urged against the extrusion. Urging face 82 and surface 44 together causes upper portion 18 to deform such that upper edge 22 moves towards edge 24. The brick is then lowered such that corner end 85 of brick 80 rests on top of toe portion 30 of the extrusion and the extrusion is held securely in place as shown in FIG. 4. Since upper portion 18 is resiliently deformable, it continues to urge against brick 80 to tightly conform against the brick. Since upper portion 18 is biased against brick 80 a relatively tight seal is maintained between upper edge 22 and brick 80, preventing any grass clippings, dirt or other debris from falling between the brick and the lawn edging device. The height of brick 80 is selected such that top surface 86 of the brick is substantially flush with top edge 22 of the extrusion to create a clean cut look when the lawn edging is installed. Brace 16 serves to keep open top 40 open by preventing wall 12 from collapsing against wall 14 when the brick is installed.

Referring now to FIGS. 5 and 6, to use lawn edging device 50, the lawn edging is first laid on bare ground 110 such that toe 68 rests on the ground. Extrusion 50 must be supported until paving brick 120 is brought into position adjacent the extrusion. The brick is positioned against extrusion 50 such that face 122 of the brick abuts against face 72 of the lawn edging device. The brick and lawn edging are then urged together such that face 122 of brick 120 is flat against surface 72 of the lawn edging. As with the previous embodiment, extrusion 50 is made of a resiliently deformable thermoplastic material such as polyethylene or PVC permitting upper portion 56 to deform when the brick is urged against the extrusion. Urging face 122 and surface 72 together causes upper portion 56 to deform such that upper edge 62 moves towards edge 64. The brick is then lowered such that corner end 124 of brick 120 rests on top of toe portion 68 of the extrusion and the extrusion is held securely in place as shown in FIG. 6. Since upper portion 56 is resiliently deformable, it continues to urge against brick 120 to tightly conform against the brick. Since upper portion 56 is biased against brick 120 a relatively tight seal is maintained between upper edge 62 and brick 120, preventing any grass clippings, dirt or other debris from falling between the brick and the lawn edging device. The height of brick 120 is selected such that top surface 126 of the brick is substantially flush with top edge 62 of the extrusion to create a clean cut look when the lawn edging is installed. Brace 60 serves to keep open top 70 open by preventing wall 54 from collapsing against wall 52 when the brick is installed.

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims.

Therefore, what is claimed is:

1. A lawn edging for use in demarcating a lawn having a plurality of paving stones, the lawn edging comprising:
   an elongated extrusion made of a flexible and resilient polymer, the extrusion having opposite ends;
   the extrusion having a bottom, first and second side walls extending from the bottom and a transverse cross brace extending between and the side walls and connecting the side walls together;
   the bottom having a toe portion extending perpendicularly from the first wall, the toe portion being dimensioned and configured to fit beneath the paving stones;
   the first wall being divided into an upper portion above the transverse cross brace and a lower portion between the transverse cross brace and the toe portion, the lower portion being perpendicular with respect to the toe portion, the upper portion of the first wall being at an obtuse angle to the lower portion such that the upper portion extends away from the lower portion of the side wall and away from the second side wall, the upper portion being configured to be sufficiently flexible and resilient such that when the first side wall is urged against the paving stones the upper portion of the first side wall is deflected to be substantially co-planar to the lower portion of the first side wall and the upper portion is biased against the paving stone.

2. The lawn edging of claim 1 wherein the first and second side walls are at an acute angle to each other.

3. A lawn edging for use in demarcating a lawn having a plurality of paving stones, the paving stones having a height, the lawn edging comprising:
   an elongated extrusion made of a flexible and resilient polymer, the extrusion having opposite ends;
   the extrusion having a bottom, first and second side walls extending from the bottom, and a transverse cross brace extending between and the side walls and connecting the side walls together, the first and second walls each being divided into an upper portion above the transverse cross brace and a lower portion between the transverse cross brace and the toe portion;
   the extrusion having an open top defined by the upper portions of the first and second walls and the transverse cross brace, the extrusion having a lower diameter defined by the distance between the lower portions of the first and second walls and an upper diameter defined by the distance between the upper first and second walls, the upper diameter being greater than the lower diameter;
   the bottom having a toe portion extending perpendicularly from the first wall, the toe portion being dimensioned and configured to fit beneath the paving stones;
   the upper portion of the first wall being at an obtuse angle to the lower portion such that the upper portion extends away from the lower portion of the side wall and away from the second side wall, the upper portion being configured to be sufficiently flexible and resilient such that when the first side wall is urged against the paving stones the upper portion of the first side wall is deflected to be substantially co-planar to the lower portion of the first side wall and the upper portion is biased against the paving stone.

4. The lawn edging of claim 3 wherein the first and second side walls are at an acute angle to each other.

5. The lawn edging of claim 3 wherein the first and second side walls have a height substantially equivalent to the height of the paving stones.

6. The lawn edging of claim 5 wherein the upper portions of the first and second walls flair outwardly.

7. The lawn edging of claim 3 wherein the upper portion of the first wall has an upper edge, the upper portion of the first wall being deformed upon urging against the paving stone, the upper edge is urged against and is flush against the paving stones.

8. The lawn edging of claim 3 wherein the bottom portion of the extrusion is closed.

\* \* \* \* \*